(12) United States Patent
Carr et al.

(10) Patent No.: US 7,885,946 B2
(45) Date of Patent: Feb. 8, 2011

(54) LOW-OVERHEAD STORAGE CLUSTER CONFIGURATION LOCKING

(75) Inventors: David John Carr, Southampton (GB); Michael John Jones, Tucson, AZ (US); Robert Bruce Nicholson, Southsea (GB); William James Scales, Fareham (GB); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/235,836

(22) Filed: Sep. 27, 2005

(65) Prior Publication Data

US 2006/0069703 A1  Mar. 30, 2006

Related U.S. Application Data

(63) Continuation of application No. PCT/GB2004/001361, filed on Mar. 29, 2004.

(30) Foreign Application Priority Data

Apr. 17, 2003  (GB) .................. 0308923.2

(51) Int. Cl.
*G06F 7/00* (2006.01)
*G06F 17/30* (2006.01)

(52) U.S. Cl. ...................... 707/704; 707/781
(58) Field of Classification Search ............. None
See application file for complete search history.

(56) References Cited

U.S. PATENT DOCUMENTS

| 5,566,305 A |   | 10/1996 | Levenstein |          |
|-------------|---|---------|------------|----------|
| 6,014,669 A | * | 1/2000  | Slaughter et al. | 707/10 |
| 6,529,906 B1 | * | 3/2003 | Chan       | 707/8    |
| 7,155,638 B1 | * | 12/2006 | Heideman et al. | 714/11 |
| 7,239,605 B2 | * | 7/2007 | Dinker et al. | 370/216 |
| 7,313,557 B1 | * | 12/2007 | Noveck     | 1/1      |

(Continued)

FOREIGN PATENT DOCUMENTS

JP         10-223392       8/1998

(Continued)

OTHER PUBLICATIONS

Coulouris, G et al., Locks, Distributed Systems: Concepts and Design, 2001, pp. 482-494.

(Continued)

*Primary Examiner*—Neveen Abel Jalil
*Assistant Examiner*—Raheem Hoffler
(74) *Attorney, Agent, or Firm*—Griffiths & Seaton PLLC

(57) ABSTRACT

A storage control apparatus, in communication with a cluster of storage devices in a storage network having plural administrator systems, comprises a cluster lock requester component, a cluster lock receiver component and a configuration component, wherein, responsive to receipt of a cluster lock by said cluster lock receiver component, the configuration component is operable to configure a logical resource object within said cluster. The apparatus may also include a cluster lock granter component operable to grant a cluster lock to the cluster lock receiver component responsive to said cluster lock requester component. A method of operating a storage control apparatus includes method steps corresponding to functional components of an apparatus and may be embodied in computer program codes.

12 Claims, 3 Drawing Sheets

U.S. PATENT DOCUMENTS

| | | | |
|---|---|---|---|
| 7,337,290 B2* | 2/2008 | Rajamani et al. | 711/163 |
| 7,403,945 B2* | 7/2008 | Lin et al. | 1/1 |
| 7,739,252 B2* | 6/2010 | Kumar et al. | 707/704 |
| 2003/0065686 A1* | 4/2003 | Callahan et al. | 707/200 |
| 2003/0065760 A1* | 4/2003 | Casper et al. | 709/223 |
| 2004/0085908 A1* | 5/2004 | Balasubramanian et al. | 370/252 |
| 2004/0133652 A1* | 7/2004 | Miloushev et al. | 707/9 |
| 2004/0205066 A1* | 10/2004 | Bhattacharjee et al. | 707/8 |
| 2005/0144173 A1* | 6/2005 | Yamamoto et al. | 707/10 |
| 2005/0187891 A1* | 8/2005 | Johnson et al. | 707/1 |
| 2005/0262143 A1* | 11/2005 | Rao et al. | 707/104.1 |
| 2005/0278332 A1* | 12/2005 | Petev et al. | 707/8 |
| 2005/0289188 A1* | 12/2005 | Nettleton et al. | 707/200 |
| 2006/0069703 A1* | 3/2006 | Carr et al. | 707/200 |
| 2006/0101081 A1* | 5/2006 | Lin et al. | 707/200 |

FOREIGN PATENT DOCUMENTS

| | | |
|---|---|---|
| JP | 2004-235987 | 8/2004 |
| WO | WO 02/13020 A2 | 2/2002 |

OTHER PUBLICATIONS

Ranade, Dilip P., Shared Data Clusters, 2002.
Managing MC/Service Guard, Hewlett-Packard, Sep. 2001.
Ranade, Dilip M., "Shared Data Clusters—Scalable, Manageable, and Highly Available," XP002332709, Published by John Wiley & Sons, Inc., 2002, 82 pages.
Office Action dated Nov. 5, 2008 for Canadian Counterpart Application No. 2,521,947.
Search Report dated May 13, 2009 for related Taiwan Application No. 093110397.
Translation of references cited in Japanese Counterpart Application No. 2006-506047 Office Action dated Mar. 9, 2010.

* cited by examiner

LOW-OVERHEAD STORAGE CLUSTER CONFIGURATION LOCKING

CROSS-REFERENCE TO RELATED APPLICATIONS

The present application is a continuation under 35 U.S.C. §120 of International Patent Application No. PCT/GB2004/001361 filed on Mar. 29, 2004 designating the United States and hereby claims benefit of priority to United Kingdom Patent Application No. 0308923.2 filed on Apr. 17, 2003, and entitled "Low-Overhead Storage Cluster Configuration Locking" under 35 U.S.C. §365, which are both incorporated by reference herein in their entireties and for all purposes.

FIELD OF THE INVENTION

The present invention relates to data storage systems, in particular to controllers for use in networked storage systems, and methods for operation thereof.

BACKGROUND OF THE INVENTION

In the field of this invention it is known that enhanced function storage systems (e.g., for a system of one or more disk drives) contain many logical resources. These resources can be managed by a storage adapter or controller. In this context, a logical resource is an entity which exposes a disk-like behaviour but which may have properties not ordinarily associated with individual disk drives. These properties include enhanced performance, reliability, availability and data transformation operations such as point in time copy. There may be a complex many-to-many relationship between logical resources and other logical resources or physical resources. For example a RAID-5 (Redundant Array of Independent Disks) arrangement contains usually between 4 and 16 component disks. Data is striped across the components and a parity check is calculated and stored. The attributes of, and relationships between, these logical resources must be gathered and manipulated to allow users to maintain their subsystem. When such subsystems are further clustered together and used in storage networks, the difficulties and resource costs of controlling the system's logical resource configuration are yet further compounded.

There is thus a need to permit distribution of system configuration control tasks among the adapters or controllers in the storage network. A distributed administration task can by its very nature be requested from any supported client. This makes it possible for two users to attempt to perform conflicting actions from different locations resulting in unpredictable results. In the case of RAID subsystems, for example, it is possible for two users to attempt to configure the same disk drives or resources. Even without remote access, when a subsystem is configured in cluster mode it can be accessed from multiple local hosts and the same problem could be encountered.

The logical resource objects maintained by the adapters possess multiple filter layers in a stack. The configuration component associates each filter resource with a resource object instance. When resource objects are created the filter layers must be added, one on top of the other, by the configuration component. During this process the cluster must be stable and it is important to ensure that no other configuration tasks are being performed simultaneously. There is scope for erroneous user interaction between each of these steps that can result in unusable or half-built resource objects.

The size of storage installations is increasing, and relying on a single point of control to configure the resources in the network is becoming unreasonably burdensome and unworkable. However, because of the complexity of configuration of logical and physical resources, conventional methods of controlling distributed systems management wholly within the configuration software layer cannot be used to prevent conflicts, for example, by enforcing serialization of access to the configuration utility program. At the same time, use of adapter-level resources must be restricted wherever possible to the satisfaction of "real" work requests for input/output operations. It is well-known to those skilled in the art that such adapters or controllers must be designed to be as economical in their overhead resource use as possible.

It would thus be desirable to provide a low-overhead system and method for distributed storage configuration control in a storage network to alleviate these problems.

SUMMARY OF THE INVENTION

The present invention accordingly provides, in a first aspect, a storage control apparatus, in communication with a cluster of storage devices in a storage network having plural administrator systems, comprising: a cluster lock requester component; a cluster lock receiver component; and a configuration component; wherein, responsive to receipt of a cluster lock by said cluster lock receiver component, said configuration component is operable to configure a logical resource object within said cluster.

The apparatus preferably further comprises a cluster lock granter component operable to grant a cluster lock to said cluster lock receiver component responsive to said cluster lock requester component.

Preferably, said cluster lock granter component is a first storage adapter component. Preferably, said cluster lock granter component informs a second storage adapter component in said cluster that a lock has been granted.

Preferably, said cluster lock granter component informs said second storage adapter component in said cluster that a lock has been released.

Preferably, said cluster lock granter component is operable to revoke said cluster lock on expiry of a timeout period.

Preferably, said cluster lock granter component is operable to revoke said cluster lock responsive to an adapter reset operation.

Preferably, said cluster lock granter component is operable to revoke said cluster lock responsive to a power cycle.

Preferably, said cluster lock granter component stores a cluster lock number in a non-volatile memory.

The present invention provides, in a second aspect, a method for operating a storage control apparatus, in communication with a cluster of storage devices in a storage network having plural administrator systems, comprising the steps of: requesting a cluster lock; receiving a cluster lock; and responsive to said step of receiving a cluster lock, configuring a logical resource object within said cluster.

In a third aspect, the present invention provides a computer program comprising computer program code to, when loaded into a computer system and executed, perform the steps of the method of the second aspect.

Preferred features of the second and third aspects comprise, respectively, method steps and computer code elements corresponding to the hardware components of the preferred features of the first aspect.

BRIEF DESCRIPTION OF THE DRAWINGS

A preferred embodiment of the present invention will now be described, by way of example only, with reference to the accompanying drawings, in which.

DESCRIPTION OF THE PREFERRED EMBODIMENT

Figure 1:
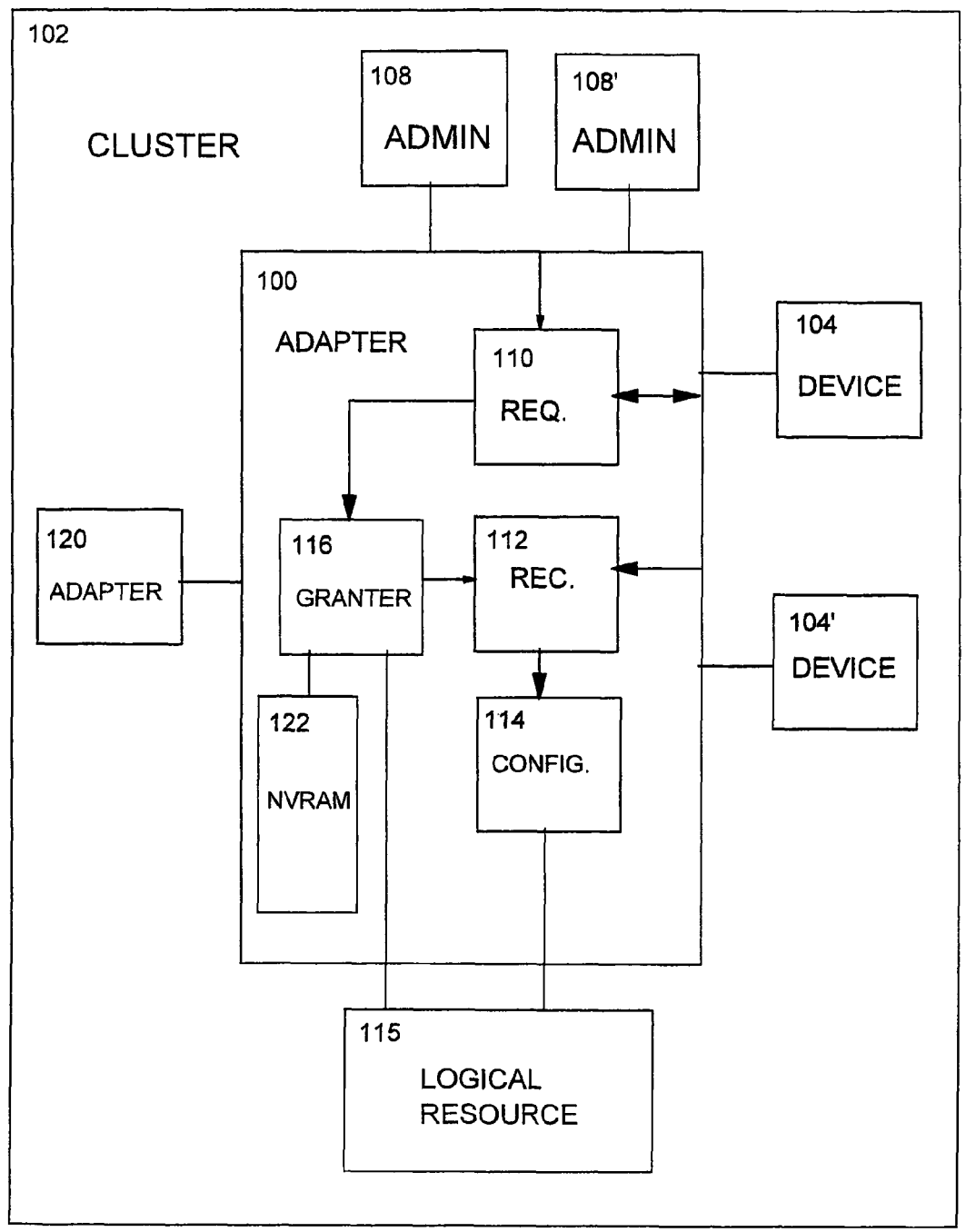
FIG. 1 shows an apparatus according to a preferred embodiment of the present invention.

In FIG. 1 is shown a storage control apparatus (100) in a cluster (102) of storage devices (104, 104', 120) of a type that is operable in a storage network (not shown) with a number of different systems (108, 108') that can be operated as administrator systems. Storage control apparatus (100) has a cluster lock requester component (110) adapted to request a cluster lock by issuing a lock request transaction. The storage control apparatus (100) has a cluster lock receiver component (112) adapted to receive a cluster lock. Responsive to receipt of a cluster lock by the cluster lock receiver component (112), configuration component (114) is operable to configure a logical resource object (115) within the cluster (102).

The storage control apparatus (100) may also include a cluster lock granter component (116) operable to grant a cluster lock to a cluster lock receiver component (112) responsive to receipt of a cluster lock request from a cluster lock requester component (110).

In an exemplary embodiment, the storage control apparatus (100) may be one in which cluster lock granter component (116) is a first storage adapter component. In an alternative embodiment, the storage control apparatus may be a first storage control component or appliance, such as a storage virtualization appliance.

In an exemplary embodiment, the storage control apparatus (100) may be one in which cluster lock granter component (116) informs a second storage adapter component (120) in said cluster (102) that a lock has been granted, or that a lock has been released, or that a lock has been revoked. In the preferred embodiment, a lock may be revoked on expiry of a timeout period. In one alternative, the lock may be revoked responsive to an adapter reset operation. In a further alternative, the lock may be revoked responsive to a power cycle.

In a storage control apparatus (100) of the exemplary embodiment, the cluster lock granter component (116) stores a cluster lock number in a non-volatile memory (122).

The preferred embodiments of the present invention provide a system and method that ensures that any tasks that have the potential to modify resources are the only such tasks that are actively configuring resources attached to a given cluster. This policy is enforced by the use of a cluster-wide lock. The lock is only required when transactions modify a logical resource object (115). View actions can continue unhindered during a configuration lock. The locking mechanism in the exemplary embodiment is based on the use of a Configuration Lock Number, the operation of which will be explained in greater detail below.

Figure 2:
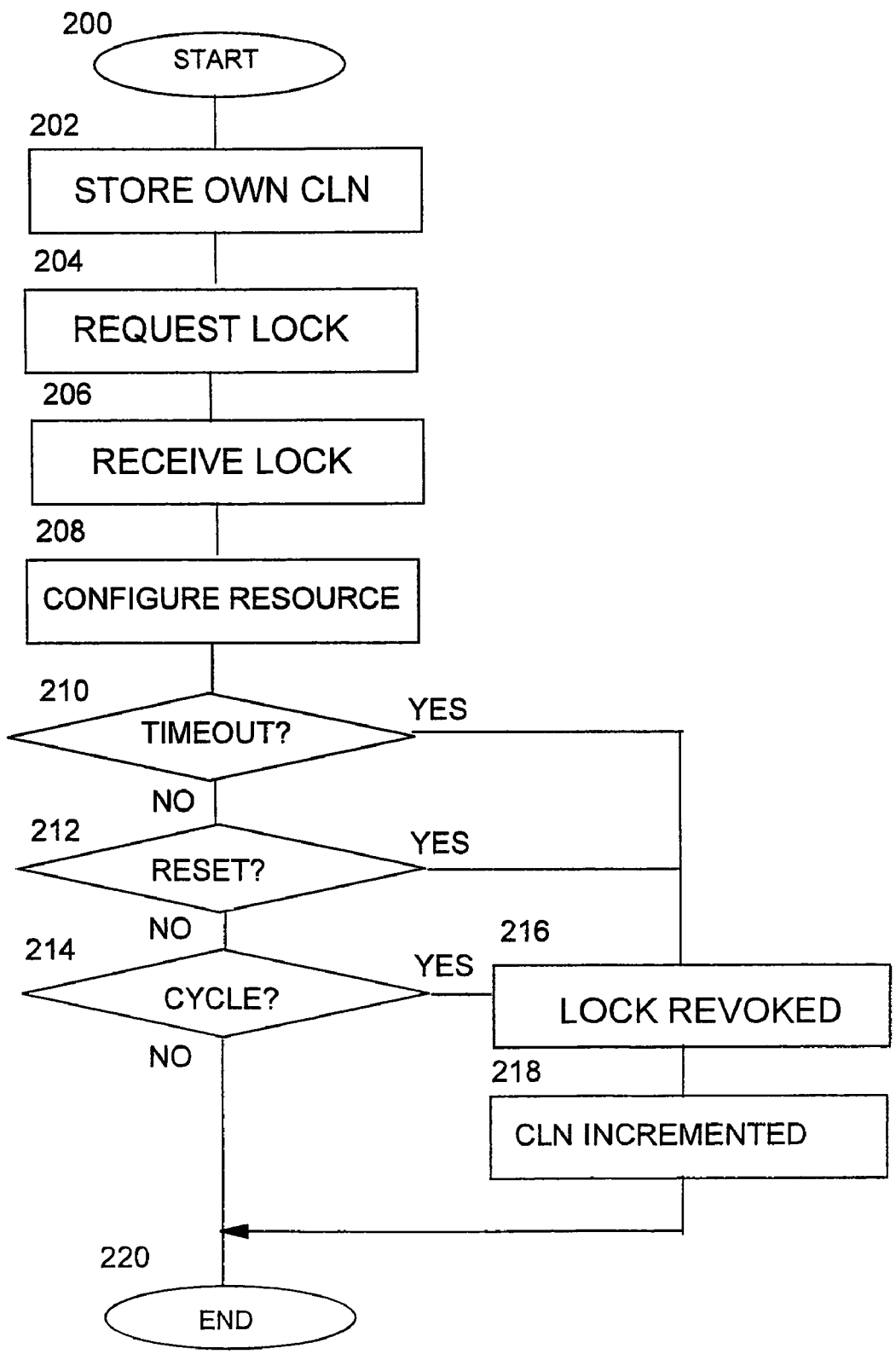
FIG. 2 shows the steps of a method performed according to a first aspect of a further preferred embodiment of the present invention.

A first aspect of the method of operation of a storage control apparatus (100) in communication with a cluster of storage devices in a storage network having plural administrator systems according to the preferred embodiment is shown in FIG. 2. At step 202, the adapter stores its CLN. At step (204), a cluster lock is requested. At step (206), a cluster lock is received. At step (208), responsive to the step of receiving a cluster lock (206), a logical resource object within the cluster is configured.

If a timeout (210), adapter reset (212), or power cycle (214) occurs, the cluster lock is revoked (216) and the CLN is incremented (218).

Figure 3:
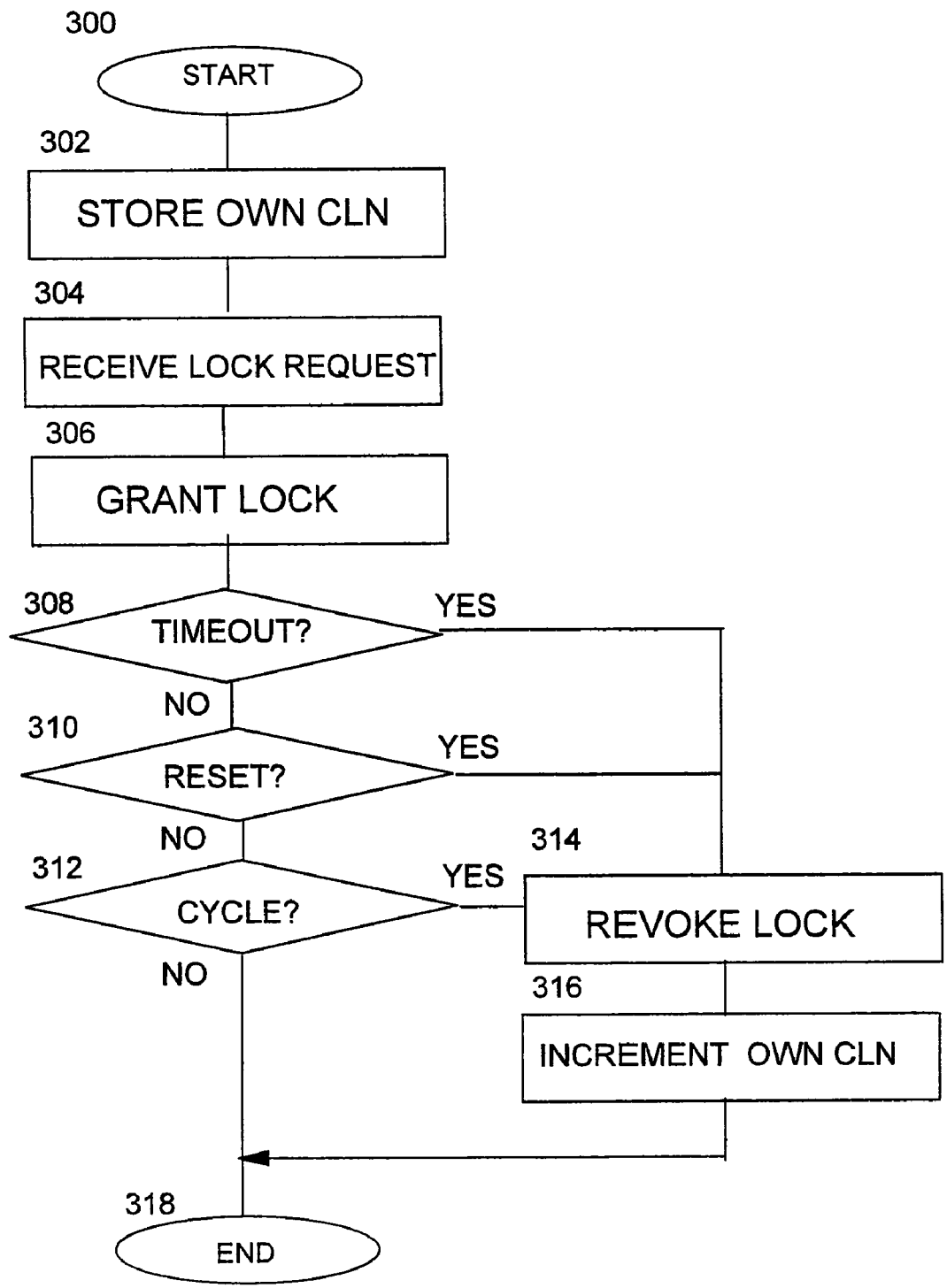
FIG. 3 shows the steps of a method performed according to a second aspect of a further preferred embodiment of the present invention.

A second aspect of the method of operation of a storage control apparatus (100) in communication with a cluster of storage devices in a storage network having plural administrator systems according to the preferred embodiment is shown in FIG. 3. At step 302, the adapter stores its CLN. At step (304), a cluster lock request is received. At step (306), a lock is granted.

If a timeout (308), adapter reset (310), or power cycle (312) is detected, the adapter revokes the cluster lock (314) and increments its CLN (316).

The configuration data is thus locked at the start of all tasks that have the potential to modify a resource object. The configuration component (114) requests the cluster lock upon receipt of such requests by sending a lock request message to the cluster. If the cluster is not already locked the request will be successful and the valid Configuration Lock Number (CLN) is returned.

In the preferred embodiment, the subsystem uses filter based configuration transactions to perform configuration. Each of the configuration transactions is modified to include a field for the CLN. A CLN of zero indicates that the configuration transaction does not require a lock and it can be processed concurrently with other configuration transactions. All view transactions, for example, can operate without a CLN. In the case of configuration transactions that modify resources, if a configuration transaction does not contain the correct CLN, the firmware based configuration agent fails it with an invalid CLN indicator.

The configuration component (114) of the preferred embodiment requests a CLN using the lock request transaction before beginning any "change of configuration" activity. If no other program has taken the lock then the transaction returns a "Success" indicator. The adapter stores an indication that the lock has been granted and it informs all other adapters in the cluster. Once a lock has been granted no further locks will be granted by this adapter or any other adapter in the cluster until the lock is released.

The configuration component (114) then supplies the returned CLN value in the CLN field of each transaction that it issues to the adapter during the configuration activity. Only the adapter that granted the current lock will accept configuration transactions that contain a non-zero CLN. When the configuration component completes the configuration activity the lock is released by issuing a release lock instruction to the adapter that granted it. The receiving adapter then informs all other adapters in the cluster that the lock has been released. The CLN is not incremented when the lock is released in this way. The CLN is only incremented when the lock is revoked, as will be explained in further detail below.

If a lock request transaction is issued to any adapter in the cluster while the lock is granted, the transaction will be rejected with an indication that the CLN is already held.

When the configuration component (114) receives this result code, it must wait until either the lock is released by the holding program or the lock is timed out. The timeout mechanism will be described in detail herein below.

In a most preferred embodiment, the adapter stores its current CLN in nonvolatile memory (such as NVRAM, or non-volatile random access memory). Following an adapter reset or power cycle, the adapter increments the value stored in NVRAM. (This effects an implicit timeout on any configuration program that was active prior to the adapter reset or power cycle.) If the CLN is not found in NVRAM, then it is set to 1. In a cluster each adapter maintains an independent CLN, i.e. the adapters do not synchronize their CLNs. Only the lock itself is shared. If two separate adapters are connected together and each has granted a lock that is still outstanding, both locks are revoked. If only one lock is outstanding, it is retained.

The rules for the locking system according to the preferred embodiment are as follows:
1. Once a lock has been granted (at step 306 of FIG. 3) and a CLN has been provided by the lock request transaction, no further locks will be granted from this or any other adapter in the cluster until the lock has been released.
2. It is impossible for two configuration utilities to simultaneously request and be granted locks.
3. A transaction request received by the adapter with the CLN field set to zero does not need a lock.
4. A transaction received by the adapter with the CLN field non-zero requires a lock, only the adapter that has granted the lock can accept the transaction, and the CLN provided in the transaction must match the CLN provided by the adapter when the lock was granted. If these conditions are not met then the transaction is failed with an invalid CLN indicator.
5. Subsequent calls to request a lock (separated by lock releases) can receive the same CLN.
6. The CLN that is returned by a lock request transaction is stored in the adapter's NVRAM. The CLN is stored in the adapter's NVRAM because configuration utility 'A' may have locked adapter 'X' with a CLN of 1. If the adapter resets (and resets its CLN to 1) and configuration utility 'B' is then granted a lock on adapter X (with the same CLN), both configuration utilities could inadvertently be using the same lock. After a reset, the adapter forgets about any locks previously granted and increments the CLN by 1. The CLN that will be returned by a lock request transaction can have any value from 1-255 and wraps from 255 to 1 (i.e., it cannot be zero)
7. When 2 adapters are connected together, if only one has granted a lock then the lock stays granted.
8. When 2 adapters are connected together, if both have granted locks then one will revoke its lock.
9. A lock will be revoked after a timeout period of, for example, two minutes. The timer is restarted after a transaction using the lock has been submitted.
10. After a lock has been revoked, the CLN that will be supplied to the next lock request transaction is incremented.
11. The CLNs are not synchronized across adapters (that is, they may be different).
12. If a lock is held by another adapter and that adapter is detached from the cluster, the lock is forgotten.

When the lock is granted in response to a lock request transaction the adapter according to a preferred embodiment starts a predetermined timeout period. The timeout is restarted when a configuration transaction with a non-zero CLN completes. The timeout is normally stopped by a release lock transaction. If no further configuration transaction containing the current CLN is received before the timeout expires, the adapter revokes the lock, increments the CLN and informs all other adapters in the cluster.

It is only when the lock is revoked (at step 316 of FIG. 3) that the CLN is incremented. A successful release lock transaction does not increment the CLN and any subsequent lock request transaction may be given the same CLN. In case any partial objects remain after a lock has been revoked, the configuration component checks identifies them and performs a clean up operation. Following an adapter reset any previous lock or timeout is forgotten.

It will be appreciated that the method described above will typically be carried out in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be appreciated that various modifications to the embodiment described above will be apparent to a person of ordinary skill in the art.

What is claimed is:

1. A computer-implemented method for providing distributed storage configuration control within a cluster of storage devices in a storage network including a plurality of administrator systems, a plurality of adapter components, and a logical resource object coupled to one another, said method comprising:

storing a configuration lock number (CLN) in a first adapter component;

receiving, by said first adapter component, a first configuration transaction request having a value in a CLN field from one of said administrator systems;

determining when said value is indicative of a first configuration transaction that modifies said logical resource object;

requesting grant of a cluster lock when said first configuration transaction modifies said logical resource object;

performing said first configuration transaction when said first configuration transaction modifies said logical resource object and said cluster lock is granted to said first adapter component;

informing, by said first adapter component, all remaining adapter components in said plurality of adapter components that said cluster lock has been granted to said first adapter component upon grant of said cluster lock;

preventing said all remaining adapter components from modifying said logical resource object prior to releasing a granted cluster lock;

performing said first configuration transaction without said cluster lock when said first configuration transaction does not modify said logical resource object;

releasing said cluster lock upon completion of said first configuration transaction; and informing, by said first adapter component, all remaining adapter components in said plurality of adapter components that said cluster lock has been released by said first adapter component upon release of said cluster lock.

2. The computer-implemented method of claim 1, further comprising revoking said cluster lock from said first adapter component in response to a timeout, a reset of said first adapter component or an occurrence of a power cycle.

3. The computer-implemented method of claim 2, wherein said revoking further includes incrementing said CLN.

4. The computer-implemented method of claim 1, further comprising rejecting any lock request to any adapter component within said storage network upon grant of said lock request.

5. The computer-implemented method of claim 1, wherein said storing further includes storing said CLN within a non-volatile memory device.

6. The computer-implemented method of claim 1, wherein performing said configuration transaction comprises configuring said logical resource object via a configuration component within said first adapter component in response to receipt of said cluster lock by a cluster lock receiver component within said first adapter component.

7. A computer storage medium having a computer program product for providing distributed storage configuration control within a storage network including a plurality of administrator systems, a plurality of adapter components, and a logical resource object coupled to one another, said computer storage medium comprising:

computer program code for storing a configuration lock number (CLN) in a first adapter component;

computer program code for receiving, by said first adapter component, a first configuration transaction request having a value in a CLN field;

computer program code for determining when said value is indicative of a first configuration transaction that modifies said logical resource object;

computer program code for requesting grant of a cluster lock when said first configuration transaction modifies said logical resource;

computer program code for rejecting any adapter component within said storage network upon grant of said lock request;

computer program code for performing said configuration transaction when said first configuration transaction modifies said logical resource object and said cluster lock is granted to said first adapter component;

computer code for informing, by said first adapter component, all remaining adapter components in said plurality of adapter components that said cluster lock has been granted to said first adapter component upon grant of said cluster lock;

computer code for preventing said all remaining adapter components from modifying said logical resource object prior to releasing a granted cluster lock;

computer program code for performing said first configuration transaction without said cluster lock when said first configuration transaction does not modify said logical resource object;

computer program code for releasing said cluster lock upon completion of said first configuration transaction; and computer code for informing, by said first adapter component, all remaining adapter components in said plurality of adapter components that said cluster lock has been released by said first adapter component upon release of said cluster lock.

8. The computer storage medium of claim 1, wherein said computer storage medium further comprises computer program code for revoking said cluster lock from said first adapter component in response to a timeout, a reset of said first adapter component or an occurrence of a power cycle.

9. The computer storage medium of claim 8, wherein said computer program code for revoking further includes computer program code for incrementing said CLN.

10. The computer-implemented method of claim 1, further comprising:

issuing, by said second adapter component, a second cluster lock for said logical resource object after said cluster lock is released;

enabling said second adapter component to modify said logical resource object after said second cluster lock is issued; and preventing said first adapter component from modifying said logical resource object prior to said second cluster lock being released.

11. The computer-implemented method of claim 1, further comprising:

receiving, by said first adapter component, a second configuration transaction request having a second value in a second CLN field from one of said administrator systems;

determining that said second value is indicative of a second configuration transaction that does not modify said logical resource object; and performing said second configuration transaction while said first configuration transaction is being performed on said logical resource object.

12. The computer-implemented method of claim 1, wherein said determining step comprises the steps of:

comparing the value in the CLN to the stored CLN;

determining that said value is indicative of a configuration transaction that modifies the logical resource when the value in the CLN and the stored CLN match; and determining that said value is not indicative of a configuration transaction that modifies the logical resource when the value in the CLN and the stored CLN do not match.

* * * * *

UNITED STATES PATENT AND TRADEMARK OFFICE
CERTIFICATE OF CORRECTION

| | | |
|---|---|---|
| PATENT NO. | : 7,885,946 B2 | Page 1 of 1 |
| APPLICATION NO. | : 11/235836 | |
| DATED | : February 8, 2011 | |
| INVENTOR(S) | : David John Carr et al. | |

It is certified that error appears in the above-identified patent and that said Letters Patent is hereby corrected as shown below:

In Column 8, line 23, delete "claim 1" and add -- claim 7 --.

Signed and Sealed this
Twelfth Day of April, 2011

David J. Kappos
*Director of the United States Patent and Trademark Office*